United States Patent

Goto et al.

(10) Patent No.: US 6,844,393 B2
(45) Date of Patent: Jan. 18, 2005

(54) HEAT-CONDUCTIVE SILICONE RUBBER COMPOSITION

(75) Inventors: Tomoyuki Goto, Annaka (JP); Toshiyuki Ozai, Takasaki (JP); Mitsuhiro Iwata, Annaka (JP); Yoshifumi Inoue, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/350,036

(22) Filed: Jan. 24, 2003

(65) Prior Publication Data

US 2003/0229174 A1 Dec. 11, 2003

(30) Foreign Application Priority Data

Jan. 25, 2002 (JP) .................................. 2002-017334

(51) Int. Cl.$^7$ .............................................. C08G 77/08
(52) U.S. Cl. ...................... 524/588; 528/31; 528/32; 528/15
(58) Field of Search ..................... 524/588; 528/15, 528/31, 32

(56) References Cited

U.S. PATENT DOCUMENTS

| | | | |
|---|---|---|---|
| 4,292,223 A | | 9/1981 | Theodore et al. |
| 4,292,224 A | | 9/1981 | Theodore |
| 4,292,225 A | | 9/1981 | Theodore et al. |
| 4,293,477 A | | 10/1981 | Theodore |
| 5,221,339 A | * | 6/1993 | Takahashi et al. ..... 106/287.13 |
| 5,256,480 A | * | 10/1993 | Inoue et al. ................. 428/331 |
| 5,352,731 A | | 10/1994 | Nakano et al. |
| 5,424,352 A | * | 6/1995 | Watanabe ................... 524/433 |
| 5,569,684 A | * | 10/1996 | Okami et al. ............... 523/209 |
| 6,040,362 A | * | 3/2000 | Mine et al. .................. 523/212 |
| 6,306,957 B1 | | 10/2001 | Nakano et al. |
| 6,380,301 B1 | * | 4/2002 | Enami et al. ................ 524/588 |
| 6,514,428 B2 | * | 2/2003 | Suzuki et al. ................. 252/74 |
| 2002/0010245 A1 | * | 1/2002 | Enami et al. |

FOREIGN PATENT DOCUMENTS

| | | |
|---|---|---|
| EP | 0 757 080 | 2/1997 |
| EP | 1 167 457 | 1/2002 |
| JP | 47-032400 | 11/1972 |
| JP | 64-069661 | 3/1989 |
| WO | 02/092693 | * 11/2002 |

* cited by examiner

*Primary Examiner*—Margaret G. Moore
(74) *Attorney, Agent, or Firm*—Oblon, Spivak, McClelland, Maier & Neustadt, P.C.

(57) ABSTRACT

A heat-conductive silicone rubber composition is provided. This composition comprises (A) an organopolysiloxane with an average of at least 0.1 alkenyl groups bonded to silicon atoms within each molecule, (B) an organopolysiloxane with an average of at least 2 hydrogen atoms bonded to silicon atoms within each molecule, (C) a heat-conductive filler, (D) a platinum catalyst, and (E) a methylpolysiloxane with a hydrolyzable group and a vinyl group, as represented by a general formula shown below. This composition displays superior molding workability and adhesion, even if a large quantity of a heat-conductive filler is added to the composition

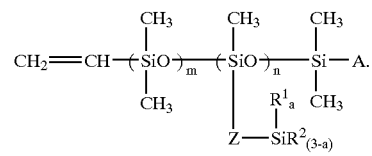

15 Claims, 1 Drawing Sheet

HEAT-CONDUCTIVE SILICONE RUBBER COMPOSITION

BACKGROUND OF THE INVENTION

1. Field of the Invention

The present invention relates to a heat-conductive silicone rubber composition which displays superior handling and moldability, and imparts a good level of adhesion, and also relates to a highly heat-conductive silicone rubber molded product produced by curing such a heat-conductive silicone rubber composition.

2. Description of the Prior Art

Heat generating components such as power transistors and thyristors suffer from a deterioration in performance as a result of the generated heat, and as a result, heat sinks are conventionally attached to these components during installation to enable the generated heat to diffuse and escape through the metallic chassis of the equipment. In this process, in order to improve the electrical insulation and the thermal conductivity, a heat radiating insulating sheet formed from a silicone rubber containing a heat-conductive filler is typically employed between the heat generating component and the heat sink.

Examples of this type of heat radiating insulating material include the insulating compositions disclosed in Japanese Laid-open publication (kokai) No. 47-32400 (JP47-32400A), comprising 100 parts by weight of a synthetic rubber such as silicone rubber, to which is added 100 to 800 parts by weight of at least one metal oxide selected from a group consisting of beryllium oxide, aluminum oxide, hydrated aluminum oxide, magnesium oxide and zinc oxide.

Furthermore, examples of heat radiating materials which can be used in those situations in which insulation is unnecessary include the compositions disclosed in Japanese Laid-open publication (kokai) No. 56-100849 (JP56-100849A) corresponding to U.S. Pat. No. 4,292,223, U.S. Pat. No. 4,292,224, U.S. Pat. No. 4,292,225 and U.S. Pat. No. 4,293,477, comprising an addition curing type silicone rubber to which is added 60 to 500 parts by weight of a heat-conductive powder such as silica, silver, gold or silicon.

However, these heat-conductive materials display a thermal conductivity of no more than 1.5 W/mK, and if a large quantity of a heat-conductive filler is then added via high filling to improve the thermal conductivity, the fluidity decreases, causing a significant deterioration in the molding workability of the composition.

In an attempt to resolve this problem, Japanese Laid-open publication (kokai) No. 1-69661 (JP1-69661A) discloses highly heat-conductive rubber and plastic compositions filled with an alumina filler comprising 10 to 30% by weight of alumina particles with an average particle diameter of no more than 5 μm, and the remainder of spherical corundum particles with no cutting edges and with an average particle diameter for a single particle of at least 10 μm. Furthermore, Japanese Laid-open publication (kokai) No. 4-328163 (JP4-328163A) corresponding to U.S. Pat. No. 5,352,731, discloses heat-conductive silicone rubber compositions comprising a base formed from a combination of a gum type organopolysiloxane with an average degree of polymerization of 6,000 to 12,000, and an oil type organopolysiloxane with an average degree of polymerization of 200 to 2,000, to which a spherical aluminum oxide powder is added in a ratio of 500 to 1,200 parts by weight of the aluminum oxide powder per 100 parts by weight of the base polymer constituents.

However even using these methods, if high filling is performed using more than 1,000 parts by weight of aluminum oxide powder per 100 parts by weight of the base polymer constituent (aluminum oxide exceeding 70 volume %), then simply adjusting the particle combinations or altering the viscosity of the silicone base is unable to produce a satisfactory improvement in the molding workability.

Consequently, as a method of improving the molding workability, Japanese Laid-open publication No. 2000-256558 (JP2000-256558A) corresponding to U.S. Pat. No. 6,306,957, discloses heat-conductive silicone rubber compositions comprising 0.1 to 50 volume % of a hydrolyzable group containing methylpolysiloxane as a wetter. According to this method, although the molding workability of the heat-conductive silicone rubber composition is improved, a major problem arises in that the adhesion of the composition to a substrate is inadequate.

SUMMARY OF THE INVENTION

The inventors of the present invention conducted intensive research aimed at resolving the problems described above, and were consequently able to complete the present invention. In other words, an object of the present invention is to provide a heat-conductive silicone rubber composition which displays superior handling and moldability, and imparts a good level of adhesion to substrates, even if a large quantity of a heat-conductive filler is added in order to form a highly heat-conductive silicone rubber.

The present invention relates to a heat-conductive silicone rubber composition comprising:

(A) 100 parts by weight of an organopolysiloxane containing an average of at least 0.1 alkenyl groups bonded to silicon atoms within each molecule and with a viscosity at 25° C. within a range from 50 to 100,000 mPa·s, (B) an organopolysiloxane containing an average of at least 2 hydrogen atoms bonded to silicon atoms within each molecule and with a viscosity at 25° C. within a range from 1 to 100,000 mPa·s, in a sufficient quantity to produce 0.1 to 3.0 mols of silicon atom-bonded hydrogen atoms within the constituent (B) per 1 mol of silicon atom-bonded alkenyl groups within the constituent (A), (C) 100 to 2,500 parts by weight of a heat-conductive filler, (D) an effective quantity of a platinum catalyst, and (E) 0.1 to 30 parts by weight per 100 parts by weight of the constituent (C) of a methylpolysiloxane with a hydrolyzable group and a vinyl group, as represented by the general formula (I):

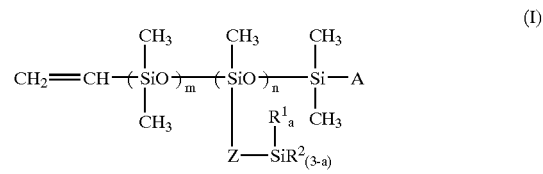

(I)

(wherein, $R^1$ represents a monovalent hydrocarbon group of 1 to 4 carbon atoms, $R^2$ represents an alkoxy group or an acyloxy group of 1 to 4 carbon atoms, Z represents an oxygen atom or a bivalent hydrocarbon group of 2 to 10 carbon atoms, a represents 0, 1 or 2, m is an integer from 3 to 100, n is an integer from 0 to 50, the sum of m+n is an integer from 3 to 100, and A is a methyl group or a group represented by a formula —Z—Si($R^1_o$)$R^2_{(3-a)}$ (wherein, $R^1$, $R^2$, a and Z are as defined above), although in the case of n=0, A is a group represented by the formula —Z—Si($R^1_a$)$R^2_{(3-a)}$); and also relates to a molded product produced by curing such a heat-conductive silicone rubber composition, and in particular a molded product with a thermal conductivity of at least 1.5 W/mK.

DETAILED DESCRIPTION OF THE PREFERRED EMBODIMENTS

Figure 1:
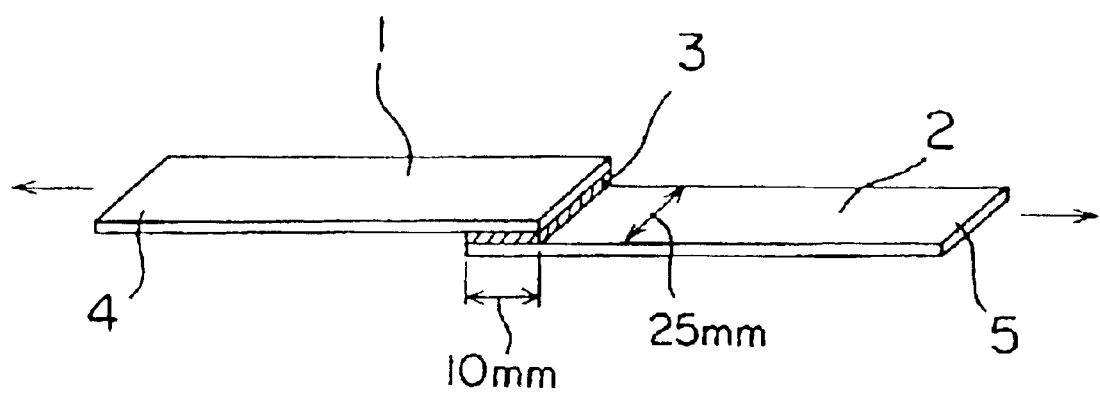
FIG. 1 is schematic diagram showing an adherend and the test conditions for a tensile shear adhesion test for a heat-conductive silicone rubber.

As follows is a more detailed description of a heat-conductive silicone rubber composition of the present invention.

[Constituent (A)]

An organopolysiloxane of the constituent (A) is a primary constituent of a composition of the present invention, and comprises an average of at least 0.1, and preferably at least 0.8, and even more preferably at least 2 alkenyl groups bonded to silicon atoms within each molecule. Furthermore, the number of alkenyl groups within each molecule is typically no more than 20, and preferably no more than 10. The reason for these requirements is that if the average value of the number of alkenyl groups bonded to silicon atoms is less than the lower limit of the range defined above, then the product composition may not undergo adequate curing, whereas if the average value exceeds the upper limit of the range defined above, then the rubber properties of the silicone rubber cured product may deteriorate.

The quantity of alkenyl groups is within a range from 0.01 to 20 mol %, and preferably from 0.1 to 10 mol % of all the organic groups bonded to silicon atoms within a single molecule. Furthermore, these alkenyl groups may be bonded to silicon atoms at the terminals of the molecular chain, to non-terminal silicon atoms within the molecular chain, or to both these types of silicon atoms, although from the viewpoints of ensuring a good curing rate for the composition and producing favorable physical properties for the cured product, the organopolysiloxane should comprise at least alkenyl groups bonded to a molecular chain terminal silicon atom, and preferably to the silicon atoms at both terminals of the molecular chain.

Examples of the alkenyl groups bonded to silicon atoms within the constituent (A) include groups of 2 to 8 carbon atoms, and preferably 2 to 6 carbon atoms, such as vinyl groups, allyl groups, butenyl groups, pentenyl groups and hexenyl groups, although vinyl groups are preferred. Furthermore, examples of other silicon atom-bonded organic groups within the constituent (A), other than the alkenyl groups, (in other words, unsubstituted or halogen substituted monovalent hydrocarbon groups bonded to silicon atoms, but excluding the alkenyl groups of the constituent (A)) include hydrocarbon groups of 1 to 12 carbon atoms, and preferably 1 to 8 carbon atoms, including alkyl groups such as methyl groups, ethyl groups and propyl groups; cycloalkyl groups such as cyclopentyl groups and cyclohexyl groups; aryl groups such as phenyl groups, tolyl groups and xylyl groups; or halogenated hydrocarbon groups in which a proportion of the hydrogen atoms of the above groups are substituted with halogen atoms such as chlorine atoms or fluorine atoms, although alkyl groups and aryl groups are preferred, and methyl groups and phenyl groups are particularly preferred. The viscosity at 25° C. of the constituent (A) is within a range from 50 to 100,000 mPa·s, and preferably from 100 to 50,000 mPa·s. The reason for this requirement is that if the viscosity at 25° C. is less than the lower limit of the range defined above, then the physical characteristics of the product silicone rubber, including the rubber strength indicated by factors such as the rubber hardness, the tensile strength and the tear strength, and other rubber properties such as the elongation, deteriorate markedly, whereas in contrast, if the viscosity exceeds the upper limit of the range defined above, then the handling and workability of the silicone rubber composition deteriorate significantly. There are no particular restrictions on the molecular structure of this type of organopolysiloxane of the constituent (A), and straight chain structures, cyclic structures, branched chain structures, partially branched straight chain structures and three dimensional network structures are all possible, although an essentially straight chain diorganopolysiloxane in which the principal chain is formed from repeating diorganosiloxane units, and both terminals of the molecular chain are blocked with triorganosiloxy groups, is preferred. Furthermore, the constituent (A) may be a single polymer with this type of molecular structure, a copolymer with this type of molecular structure, or a mixture of different polymers with this type of molecular structure.

This organopolysiloxane can be produced using conventionally known methods. In a typical production method, the organopolysiloxane is produced by conducting an equilibration reaction of an organocyclooligosiloxane and a hexaorganodisiloxane in the presence of either an alkali or acid catalyst. Specific examples of the constituent (A) include the compounds represented by the general formulas shown below.

In the formulas below, the group R represents a substituted or unsubstituted monovalent hydrocarbon group bonded to a silicon atom, but excluding alkenyl groups, as described above, and is preferably a methyl group or a phenyl group. m and n are integers which satisfy m≦1 and n≦0 respectively, although m is preferably an integer from 1 to 20 and n is preferably an integer from 10 to 1,000, and m+n is a value which produces an organopolysiloxane viscosity within the range described above.

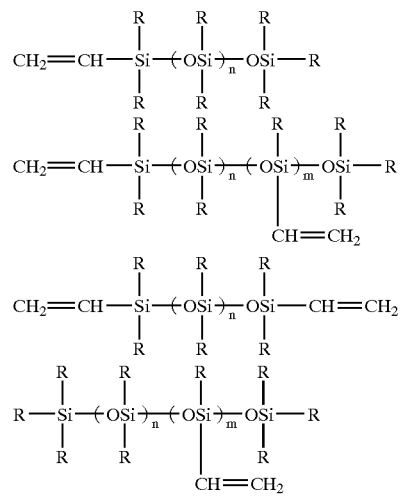

-continued

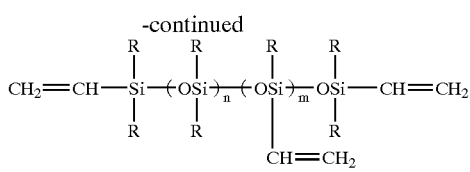

[Constituent (B)]

An organopolysiloxane of the constituent (B) functions as a cross linking agent for a composition of the present invention, and is an organohydrogenpolysiloxane with an average of at least 2 hydrogen atoms bonded to silicon atoms (namely, SiH groups) within each molecule.

The constituent (B) reacts with the constituent (A), functioning as a cross linking agent. There are no particular restrictions on the molecular structure of the constituent (B), and any of the conventionally produced materials, including straight chain structures, cyclic structures, branched chain structures, and three dimensional network structures, can be used, although the average number of hydrogen atoms bonded to silicon atoms (SiH groups) within each molecule must be at least 2, and should preferably be from 2 to 200, or even more preferably from 3 to 100. Examples of suitable organohydrogenpolysiloxanes include those represented by an average composition formula (1) shown below $$R^4{}_b H_c SiO_{(4-b-c)/2} \quad (1)$$

In the above formula (1), $R^4$ represents an unsubstituted or substituted monovalent hydrocarbon group, preferably of 1 to 10 carbon atoms, but excludes groups with aliphatic unsaturated bonds. Examples of this group $R^4$ include those substituted or unsubstituted monovalent hydrocarbon groups bonded to silicon atoms, but excluding alkenyl groups, described above in relation to the constituent (A), although alkyl groups and aryl groups are preferred, and methyl groups and phenyl groups are particularly preferred. b represents a positive number from 0.7 to 2.1, and c represents a positive number from 0.001 to 1.0, although b+c must be from 0.8 to 3.0, and b values from 1.0 to 2.0, c values from 0.01 to 1.0, and b+c values from 1.5 to 2.5 are particularly preferred.

The constituent (B) must have at least two, and preferably three or more SiH groups within each molecule, and these SiH groups may be positioned at the terminals of the molecular chain, at non-terminal positions, or at both these positions. The number of silicon atoms within each molecule (or the degree of polymerization) is typically within a range from 2 to 300, and preferably from 4 to 150, and the constituent (B) is a liquid at room temperature (25° C.) with a viscosity at 25° C. within a range from 1 to 100,000 mPa·s, and preferably from 1 to 5,000 mPa·s.

Specific examples of the organohydrogenpolysiloxane of the formula (1) include 1,1,3,3-tetramethyldisiloxane, methylhydrogencyclopolysiloxane, cyclic copolymers of methylhydrogensiloxane and dimethylsiloxane, methylhydrogenpolysiloxane with both terminals blocked with trimethylsiloxy groups, copolymers of dimethylsiloxane and methylhydrogensiloxane with both terminals blocked with trimethylsiloxy groups, dimethylpolysiloxane with both terminals blocked with dimethylhydrogensiloxy groups, copolymers of dimethylsiloxane and methylhydrogensiloxane with both terminals blocked with dimethylhydrogensiloxy groups, copolymers of methylhydrogensiloxane and diphenylsiloxane with both terminals blocked with trimethylsiloxy groups, copolymers of methylhydrogensiloxane, diphenylsiloxane and dimethylsiloxane with both terminals blocked with trimethylsiloxy groups, copolymers of methylhydrogensiloxane, dimethylsiloxane and diphenylsiloxane with both terminals blocked with dimethylhydrogensiloxy groups, copolymers formed from $(CH_3)_2HSiO_{1/2}$ units, $(CH_3)_3SiO_{1/2}$ units and $(C_6H_5)_3SiO_{1/2}$ units, and copolymers formed from $(CH_3)_2HSiO_{1/2}$ units, $SiO_{4/2}$ units and $(C_6H_5)_3SiO_{1/2}$ units.

The constituent (B) can be produced using conventionally known methods. In a typical production method, octamethylcyclotetrasiloxane and/or tetramethylcyclodisiloxane, and a compound to from the terminal groups such as hexamethyldisiloxane or a compound incorporating a 1,1'-dihydro-2,2',3,3'-tetramethyldisiloxane unit are subjected to equilibration in the presence of a catalyst such as sulfuric acid, trifluoromethanesulfonic acid or methanesulfonic acid, at a temperature of −10 to +40° C.

The quantity of the constituent (B) should be sufficient to generate 0.1 to 3.0 mols, and preferably 0.2 to 2.0 mols of the silicon atom-bonded hydrogen atoms within the constituent (B) per 1 mol of silicon atom-bonded alkenyl groups within the constituent (A). The reason for this requirement is that if the quantity of the constituent (B) is less than the lower limit of the above range, then the product silicone rubber composition may not undergo adequate curing, whereas if the average value exceeds the upper limit of the range defined above, then the product silicone rubber is extremely hard, and a plurality of cracks may appear in the rubber surface.

[Constituent (C)]

Suitable heat-conductive fillers for the constituent (C) include one or more inorganic powders selected from a group comprising materials such as aluminum oxide, zinc oxide, silicon oxide, silicon carbide, silicon nitride, magnesium oxide, aluminum nitride, boron nitride and graphite, or one or more metallic powders selected from a group comprising metals such as aluminum, copper, silver, nickel, iron and stainless steel, or suitable combinations of each type of powder. There are no particular restrictions on the average particle diameter of the constituent (C), although values of no more than 50 μm are preferred. If the average particle diameter exceeds 50 μm, then the dispersibility deteriorates, and if a liquid silicone rubber is left to stand, then the heat-conductive filler may precipitate out. The lower limit for the average particle diameter is typically 0.01 μm, or preferably 0.1 μm. This average particle diameter can be determined, for example, as a weight average value (or a median diameter) of particle distribution measurements conducted using a laser light diffraction method. Furthermore, the shape of the particles of the heat-conductive filler should preferably be close to spherical. The closer the shape of the particles is to being spherical, the easier it becomes to suppress increases in viscosity, even with high filling. Specific examples of this type of spherical heat-conductive filler include materials of the spherical alumina AS series manufactured by Showa Denko Co., Ltd., and materials of the high purity spherical alumina AO series manufactured by Admatechs Co., Inc. In addition, by combining a powder of a heat-conductive filler with a large particle diameter with a powder of a heat-conductive filler with a small particle diameter in a proportion determined in accordance with a closest packing theoretical distribution curve, the packing efficiency can be improved, and lower viscosities and higher thermal conductivities can be achieved.

The quantity of the constituent (C) is typically within a range from 100 to 2,500 parts by weight, and preferably from 500 to 2,500 parts by weight, and even more preferably from 500 to 2,000 parts by weight, and most preferably from 1,000 to 2,000 parts by weight, per 100 parts by weight of the constituent (A). The reason for this requirement is that if the quantity of the constituent (C) is less than the lower limit of the above range, then there is a danger that the product silicone rubber will have insufficient thermal conductivity, whereas in contrast, if the quantity exceeds the upper limit of the range defined above, then mixing the silicone rubber composition becomes difficult, and there is a danger of the viscosity of the composition increasing and the molding workability deteriorating.

[Constituent (D)]

A platinum catalyst of the constituent (D) is a catalyst for promoting the curing of a composition of the present invention. Suitable examples of the catalyst include chloroplatinic acid, alcohol solutions of chloroplatinic acid, olefin complexes of platinum, alkenylsiloxane complexes of platinum, and carbonyl complexes of platinum.

There are no particular restrictions on the quantity of the constituent (D) used, which need only be an effective catalytic quantity. A typical quantity, calculated as a weight referenced quantity of metallic platinum within the constituent, is within a range from 0.01 to 1,000 ppm, and preferably from 0.05 to 500 ppm, and even more preferably 0.1 to 500 ppm, relative to the combined weight of the constituents (A) and (B). The reason for this requirement is that if the quantity of the constituent (D) is less than the lower limit of the above range, then the product silicone rubber composition may not undergo adequate curing, whereas in contrast, if the average value exceeds the upper limit of the range defined above, then no further improvement is observed in the curing rate of the product silicone rubber composition.

[Constituent (E)]

The constituent (E) is the constituent which produces superior handling and moldability, and imparts a good level of adhesion, even if a large quantity of the heat-conductive filler of the constituent (C) is added, and as such is the constituent which provides the characteristic feature of the present invention. The constituent (E) is a compound represented by a general formula (I) shown below

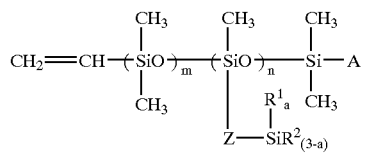

(I)

(wherein, $R^1$ represents a monovalent hydrocarbon group of 1 to 4 carbon atoms, $R^2$ represents an alkoxy group or an acyloxy group of 1 to 4 carbon atoms, Z represents an oxygen atom or a bivalent hydrocarbon group of 2 to 10 carbon atoms, a represents 0, 1 or 2, m is an integer from 3 to 100, n is an integer from 0 to 50, and the sum of m+n is an integer from 3 to 100. Furthermore, A is a methyl group or a group represented by a formula —Z—Si($R^1_a$)$R^2_{(3-a)}$ (wherein, $R^1$, $R^2$, a and Z are as defined above), although in the case of n=0, A is a group represented by the formula —Z—Si($R^1_a$)$R^2_{(3-a)}$.)

Specific examples of the $R^1$ group include alkyl groups such as methyl groups, ethyl groups, propyl groups and butyl groups, whereas specific examples of the $R^2$ group include methoxy groups, ethoxy groups, n-propoxy groups, isopropoxy groups, n-butoxy groups and acetoxy groups. Examples of the Z group include an oxygen atom, or bivalent hydrocarbon groups such as the following alkylene groups: —$CH_2CH_2$—, —$CH_2CH_2CH_2$—, —$CH_2CH_2CH_2CH_2CH_2CH_2$—, —$CH_2CH(CH_3)CH_2$—

In addition, a is preferably 0 or 1, and even more preferably 0, m is preferably an integer from 5 to 50, n is preferably an integer from 0 to 10, and the sum of m+n is preferably an integer from 5 to 60. If the sum of m+n is less than 5, then the viscosity reducing effect of the composition may be inadequate.

In addition, in those cases in which the constituent (E) is a hydrolyzable methylpolysiloxane which is trifunctional at one terminal, as represented by a general formula (II) shown below, the viscosity and plasticity reducing effects of the composition are further enhanced.

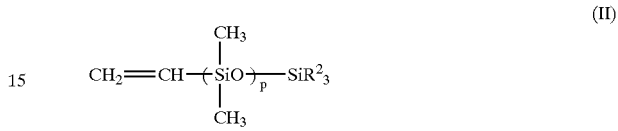

(II)

(wherein, $R^2$ is as defined above in relation to the general formula (I), and p represents an integer from 4 to 101, and preferably from 10 to 80, and even more preferably from 10 to 60).

As follows is a series of representative examples of the hydrolyzable group containing methylpolysiloxane of the constituent (E), although the present invention is in now way limited to the examples presented here.

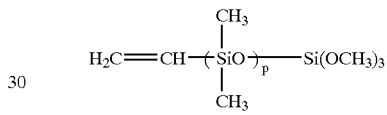

(wherein, p is as defined above)

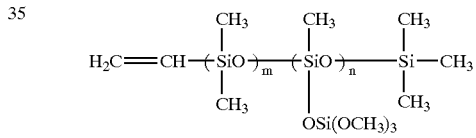

(wherein, m represents an integer from 10 to 80, and preferably from 20 to 60, n represents an integer from 1 to 20, and preferably 1 to 10, and m+n represents an integer from 11 to 100, and preferably from 21 to 70)

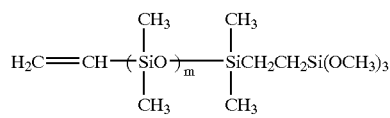

(wherein, m represents an integer from 10 to 100, and preferably from 30 to 100)

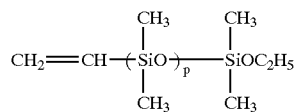

(wherein, p is as defined above)

The quantity added of the constituent (E) is typically within a range from 0.1 to 30 parts by weight, and preferably from 0.1 to 20 parts by weight, and even more preferably from 0.1 to 10 parts by weight, per 100 parts by weight of the constituent (C). The reason for this requirement is that if the quantity of the constituent (E) is less than the lower limit of the above range, then the moldability of the product silicone rubber composition deteriorates, whereas in contrast, if the quantity exceeds the upper limit of the range defined above, then not only is no additional effect apparent, meaning any further addition is wasted, but there is a danger that the hydrolyzable group containing methylpolysiloxane may bleed from the composition following curing.

Usage of the constituent (E) also includes methods in which the surface of the constituent (C) is pretreated with the constituent (E). Methods for treating the surface of the constituent (C) with the constituent (E) include methods in which the constituent (C) and the constituent (E) are mixed together in order to pretreat the surface of the constituent (C) with the constituent (E), and methods in which the constituent (C) is first mixed with the constituent (A), the constituent (E) is then added, and the surface of the constituent (C) is treated with the constituent (E) within the medium of the constituent (A). In these methods, the mixtures should preferably be kneaded using a mixer such as a planetary mixer, a kneader or a Shinagawa mixer, while being heated at a temperature of at least 80° C. Even without heating, the viscosity and the plasticity of the composition can be lowered by kneading for a long period, although heating is necessary to shorten the production process and reduce the load on the mixer during combination of the constituents. In a composition of the present invention obtained in this manner, the constituent (E) exists as a surface treatment on the constituent (C), although the constituent (E) may also exist separately from the constituent (C).

[Other Constituents]

Examples of other optional constituents which may be added include constituents for regulating the curing rate or the storage stability of the composition, including vinyl group containing organopolysiloxanes such as methylvinylcyclotetrasiloxane, as well as triallylisocyanurate, and acetylene alcohols or siloxane modified products thereof. Furthermore, provided their inclusion does not impair the actions and effects of the present invention, other additives such as silicone resins, reinforcing silica, coloring agents, reagents for improving the heat resistance such as iron oxide and cerium oxide, flame resistance imparting agents, plasticizers, and adhesion imparting agents may also be added to a composition of the present invention.

There are no particular restrictions on the method used for curing a composition of the present invention, and suitable examples include methods in which a composition of the present invention is subjected to molding and is then left to stand at room temperature, and methods in which following molding of the composition, the molded product is heated at a temperature of 50 to 200° C. Furthermore, there are no particular restrictions on the nature of the silicone rubber molded product obtained on curing, and products from very hard rubbers through to gel type products with very low hardness values are possible. In addition, the thermal conductivity of the product silicone rubber molded product should be at least 1.5 W/mK, and preferably from 1.5 to 10 W/mK, and even more preferably from 2.0 to 8 W/mK.

EXAMPLES

As follows is a more detailed description of a heat-conductive silicone rubber composition of the present invention using a series of examples. The heat-conductive silicone rubber compositions of the examples and comparative examples were prepared by combining the constituents described below in the ratios (parts by weight) shown in the Table 1.

Constituent (A)

Constituent a-1: A dimethylpolysiloxane with both terminals blocked with dimethylvinylsiloxy groups, and with a viscosity at 25° C. of 30,000 mPa·s. dimethylvinylsiloxy groups, and with a viscosity at 25° C. of 600 mPa·s.

Constituent (B)

Constituent b: An organohydrogenpolysiloxane represented by a formula $(CH_3)_3SiO[SiH(CH_3)O]_2Si(CH_3)_3$ (Quantity of Si bonded H: 0.01451 mol/g) with a viscosity at 25° C. of 5 mPa·s.

Constituent (C)

Constituent c-1: A spherical aluminum oxide powder with an average particle diameter of 10 μm (brand name: Admafine AO-41R, manufactured by Admatechs Co., Inc.) Constituent c-2: A spherical aluminum oxide powder with an average particle diameter of 0.7 μm (brand name: Admafine AO-502, manufactured by Admatechs Co., Inc.)

Constituent D

Constituent d: A vinylsiloxane complex of chloroplatinic acid (containing 1% by weight of platinum)

Constituent E

Constituent e-1:

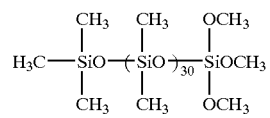

Constituent e-2:

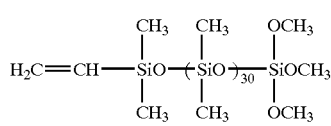

Constituent e-3:

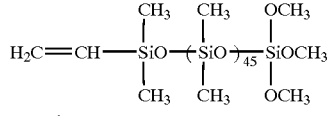

Constituent e-4:

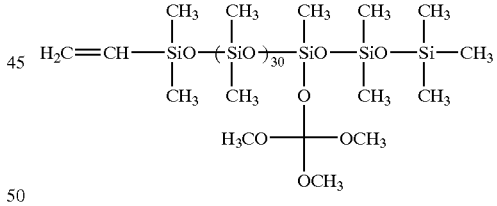

Constituent F (optional additives)

Constituent f-1: triallylisocyanurate

Constituent f-2: ethynylcyclohexanol/50% toluene solution

The characteristics shown in Table 1 are the results of measurements conducted at 25° C. on the molded products following curing. These characteristics were measured using the methods described below.

[Hardness of Heat-Conductive Silicone Rubbers]

Measured in accordance with JIS K 6249.

[Thermal Conductivity of Heat-Conductive Silicone Rubbers]

Measured in accordance with the guarded heat flow meter technique of ASTM E 1530.

[Tensile Shear Strength of Heat-conductive Silicone Rubbers]

Measured with reference to JIS K 6249. As shown in FIG. 1, the tips of two rectangular strips of aluminum 1, 2 of width 25 mm were bonded together with a thin layer 3 of a composition (adhesive) of thickness 2 mm sandwiched between the strips (adhesion surface area: 25 mm×10 mm=2.5 cm$^2$), and the composition was then cured by heating for 1 hour at 120° C. to complete the preparation of the test specimen. Using a tensile tester, the two ends 4, 5 of the test specimen were then pulled in the directions of the arrows at a speed of 50 mm/minute to measure the shearing strength.

[Aluminum/Aluminum Shear Adhesion Strength of Heat-Conductive Silicone Rubbers]

Measured in accordance with JIS K 6249.

Examples 1 to 5, Comparative Examples 1, 2

First, the constituent (A), the constituent (C) and the constituent (E) were combined in the relative quantities shown in Table 1 and Table 2, and then kneaded for 10 minutes at room temperature using a Shinagawa mixer. The mixture was then kneaded for a further 1 hour while the temperature was raised to 150° C. by heating. The thus obtained base was left to stand until the temperature had fallen below 40° C. The constituent (D) was then added and mixed uniformly, followed by the constituent (F), and then finally the constituent (B) was added and mixed uniformly to complete the preparation of a heat-conductive silicone rubber composition.

Each of these silicone rubber compositions was cured by heating for 1 hour at 120° C., and the hardness, the thermal conductivity, the tensile shear strength, and the shear adhesion strength were measured using the methods described above. The results of the measurements are shown in Table 1 and Table 2.

TABLE 1

| Composition | | Example No. | | | | |
|---|---|---|---|---|---|---|
| (parts by weight) | | 1 | 2 | 3 | 4 | 5 |
| Constituent (A) | a-1 | 40 | 40 | 0 | 0 | 0 |
| | a-2 | 108 | 108 | 148 | 148 | 148 |
| Constituent (B): b | | 1.7 | 1.7 | 2.2 | 2.2 | 2.2 |
| Constituent (C) | c-1 | 2240 | 2240 | 2240 | 2240 | 2240 |
| | c-2 | 560 | 560 | 560 | 560 | 560 |
| Constituent (D): d | | 0.2 | 0.2 | 0.2 | 0.2 | 0.2 |
| Constituent (E) | e-1 | 30 | 0 | 0 | 0 | 0 |
| | e-2 | 30 | 60 | 60 | 0 | 30 |
| | e-3 | 0 | 0 | 0 | 60 | 0 |
| | e-4 | 0 | 0 | 0 | 0 | 30 |
| Constituent (F) | f-1 | 1 | 1 | 1 | 1 | 1 |
| | f-2 | 0.3 | 0.3 | 0.3 | 0.3 | 0.3 |
| Hardness | | 97 | 97 | 98 | 96 | 97 |
| Thermal conductivity (W/mK) | | 4.0 | 4.0 | 4.0 | 4.0 | 4.0 |
| Tensile shear strength (MPa) | | 3.4 | 3.4 | 3.8 | 4.3 | 4.1 |
| Aluminum/aluminum shear adhesion strength (MPa) | | 1.0 | 1.2 | 1.3 | 1.4 | 1.3 |

TABLE 2

| | | Comparative Example | |
|---|---|---|---|
| Composition (parts by weight) | | 1 | 2 |
| Constituent (A) | a-1 | 40 | 40 |
| | a-2 | 108 | 108 |
| Constituent (B): b | | 1.7 | 1.7 |
| Constituent (C) | c-1 | 2240 | 2240 |
| | c-2 | 560 | 560 |
| Constituent (D): d | | 0.2 | 0.2 |
| Constituent (E) | e-1 | 0 | 60 |
| | e-2 | 0 | 0 |
| | e-3 | 0 | 0 |
| | e-4 | 0 | 0 |
| Constituent (F) | f-1 | 1 | 1 |
| | f-2 | 0.3 | 0.3 |
| Hardness | | Note 1 | 92 |
| Thermal conductivity (W/mK) | | | 4.0 |
| Tensile shear strength (MPa) | | | 2.2 |
| Aluminum/aluminum shear adhesion strength (MPa) | | | 0.3 |

Note 1: The molding workability was extremely poor.

A heat-conductive silicone rubber composition of the present invention displays superior handling and moldability, and exhibits a good level of adhesion, even if a large quantity of a heat-conductive filler is added. In addition, a silicone rubber molded product produced by curing such a composition is not only highly heat-conductive, but also displays excellent mechanical characteristics.

What is claimed is:

1. A heat-conductive silicone rubber composition comprising:

(A) 100 parts by weight of an organopolysiloxane containing an average o at least 0.1 alkenyl groups bonded to silicon atoms within each molecule and with a viscosity at 25° C. within a range from 50 to 100,000 mPa·s, (B) an organopolysiloxane containing an average of at least 2 hydrogen atoms bonded to silicon atoms within each molecule and with a viscosity at 25° C. within a range from 1 to 100,000 mPa·s, in a sufficient quantity to produce 0.1 to 3.0 mols of silicon atom-bonded hydrogen atoms within said constituent (B) per 1 mol of silicon atom-bonded alkenyl groups within said constituent (A), (C) 100 to 2,500 parts by weight of a heat-conductive filler, (D) an effective quantity of a platinum catalyst, and (E) 0.1 to 30 parts by weight per 100 parts by weight of said constituent (C) of a methylpolysiloxane with a hydrolyzable group and a vinyl group, as represented by a general formula (I):

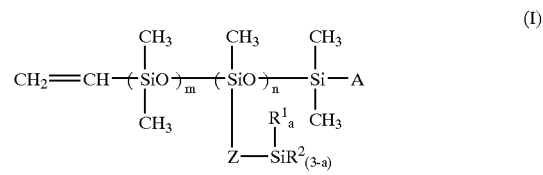

wherein, R represents a monovalent hydrocarbon group of 1 to 4 carbon atoms, R$^2$ represents an alkoxy group or an acyloxy group of 1 to 4 carbon atoms, Z represents an oxygen atom or a bivalent hydrocarbon group of 2 to 10 carbon atoms, a represents 0, 1 or 2, m is an integer from 9 to 100, n is an integer from 0 to 50, the sum of m+n is an integer from 9 to 100, and A is a methyl group or a group represented by a formula —Z—Si($R^1_a$)$R^2_{(3-a)}$ where $R^1$, $R^2$, a and Z are as defined above, although in a case of n=0, A is a group represented by said formula —Z—Si($R^1_a$)$R^2_{(3-a)}$.

2. The composition according to claim 1, wherein said methylpolysiloxane of said constituent (E) is a hydrolyzable methylpolysiloxane which is trifunctional at one terminal, as represented by a general formula (H):

(II)

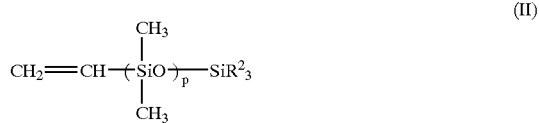

wherein, $R^2$ is as defined above in relation to said general formula (I), and p represents an integer from 10 to 101.

3. The composition according to claim 1, wherein said heat-conductive filler of said constituent (C) is an inorganic powder and/or a metallic powder.

4. The composition according to claim 3, wherein said inorganic powder comprises at least one member selected from the group consisting of aluminum oxide, zinc oxide, silicon oxide, silicon carbide, silicon nitride, magnesium oxide, aluminum nitride, boron nitride and graphite, and said metallic powder comprises at least one metal selected from the group consisting of aluminum, copper, silver, nickel, iron and stainless steel.

5. A molded product produced by curing composition according to claim 1.

6. The molded product according to claim 5, with a thermal conductivity of at least 1.5 W/mK.

7. The composition according to claim 1, wherein in formula (I) Z represents an oxygen atom.

8. The composition according to claim 1, wherein in formula (I) Z represents a bivalent hydrocarbon group of 2 to 10 carbon atoms.

9. The composition according to claim 1, wherein in formula (I), $R^2$ represents an alkoxy group of 1 to 4 carbon atoms.

10. The composition according to claim 1, wherein in formula (I), $R^2$ represents an acyloxy group of 1 to 4 carbon atoms.

11. The composition according to claim 7, wherein in formula (I), $R^2$ represents an alkoxy group of 1 to 4 carbon atoms.

12. The composition according to claim 8, wherein in formula (I), $R^2$ represents an alkoxy group of 1 to 4 carbon atoms.

13. The composition according to claim 1, wherein (E) is of the formula

Constituent e-2:

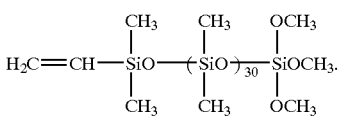

14. The composition according to claim 1, wherein (E) is of the formula

Constituent e-3:

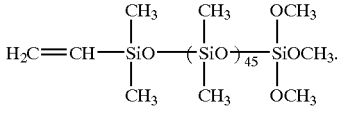

15. The composition according to claim 1 wherein (E) is of the formula

Constituent e-4:

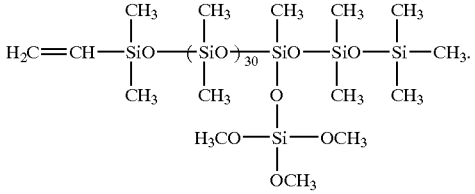

* * * * *